G. E. ZIEMANN.
VEHICLE SIGNALING DEVICE.
APPLICATION FILED AUG. 1, 1919.
1,330,970.
Patented Feb. 17, 1920.
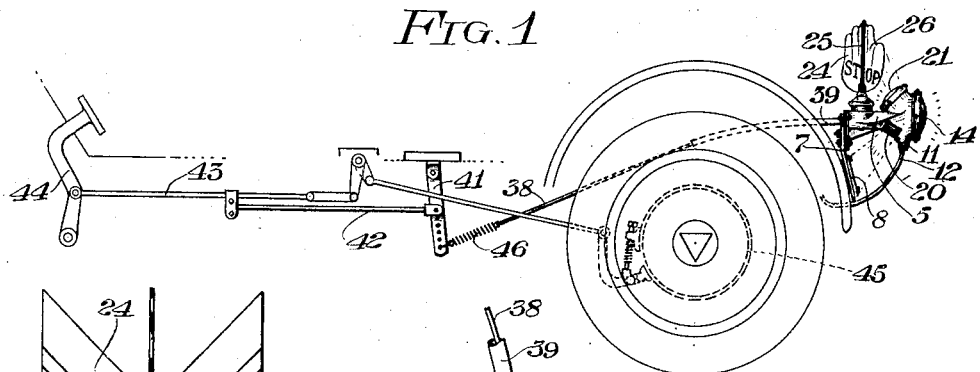
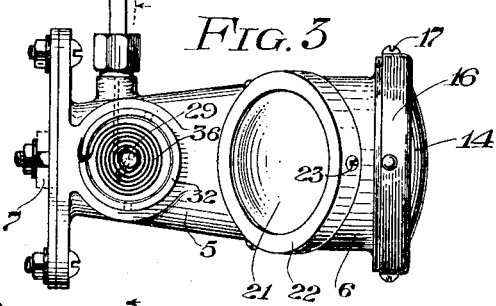
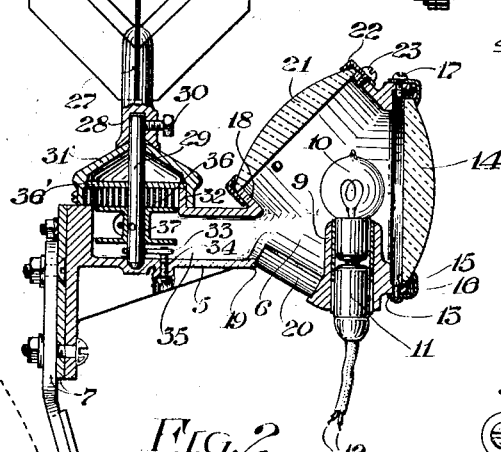
WITNESSES
INVENTOR
Gustav E. Ziemann
By R. S. Caldwell
ATTORNEY

UNITED STATES PATENT OFFICE.

GUSTAV E. ZIEMANN, OF MILWAUKEE, WISCONSIN, ASSIGNOR OF ONE-FOURTH TO HENRY W. FLATOW, OF MILWAUKEE, WISCONSIN.

VEHICLE SIGNALING DEVICE.

1,330,970.  Specification of Letters Patent.  Patented Feb. 17, 1920.

Application filed August 1, 1919. Serial No. 314,605.

*To all whom it may concern:*

Be it known that I, GUSTAV E. ZIEMANN, a citizen of the United States, and resident of Milwaukee, in the county of Milwaukee and State of Wisconsin, have invented new and useful Improvements in Vehicle Signaling Devices, of which the following is a description, reference being had to the accompanying drawings, which are a part of this specification.

The invention relates to vehicle signaling devices and more particularly a stop signal which may be used during the day or night.

Many accidents result from rear end collisions of automobiles because the driver in the car behind does not slacken his speed when approaching a car or because the driver in front when applying his brakes to slacken speed, as in making a turn, has no way of indicating his intention to the driver of the car following. This invention has for its object to provide a "stop" signal which is automatically displayed on the application of the brake so that the operator is relieved of the necessity of operating the signal himself and the driver behind is instantly warned of the operator's intention to slow down or stop.

A further object of this invention is to provide a means for illuminating the signal at night combined with a tail light.

The invention further consists in the several features hereinafter set forth and more particularly defined by claims at the conclusion hereof.

In the drawings: Figure 1 is a side elevation view of the device showing it applied to an automobile; Fig. 2 is a vertical sectional view through the device embodying the invention; Fig. 3 is a top view of the device, parts being removed; Fig. 4 is a section taken on the line 4—4 of Fig. 3.

In the drawings the numeral 5 indicates a casing which forms a support for the signal and the casing 6 of the tail light. This casing 5 may be formed integral with or, as shown, be bolted to the bracket 7 carrying the license plate 8.

The casing 6 has an inwardly projecting tubular portion 9 receiving the electric bulb 10 and the terminal plug 11 carrying the lead wires 12 which supply current to said bulb. An opening 13 is formed in the rear end of the casing and the usual red glass lens 14 is mounted therein being carried between two flanged rings 15 and 16, the ring 16 being detachably secured to the casing by screws 17. The casing 6 also has an upwardly and forwardly inclined flanged opening 18 in its top and a downwardly and forwardly inclined opening 19 in its bottom. A translucid piece of material 20, such as celluloid, is detachably mounted in the opening 19 and preferably is convexly curved transversely of the casing so as to allow some of the rays from the bulb 10 to pass therethrough and display the license plate 8. A clear glass lens 21 is mounted on the flanged opening 18 and is secured in position by a flanged ring 22 provided with screws 23 for attachment to the casing. With this construction when the bulb 10 is lighted it will display a red light to the rear, will illuminate the license plate and will illuminate the stop signal hereinafter described.

The stop signal consists of a signal indicator 24 and its operating means. This indicator may be made in various ways but is preferably formed by an arrow 25 and a hand 26 bearing the word "Stop", both coaxially mounted in a tubular support 27 which is provided with a bore 28 in which the upper end of an actuating shaft 29 is seated and to which it is detachably secured by a set screw 30. The arrow 25 is displayed at the rear of the vehicle to indicate all is well and the turning of the shaft 29 a quarter turn brings the hand 26 with its "stop" sign into indicating position to warn the driver approaching from the rear.

The shaft 29 is journaled in the casing 5 and in a removable cap 31 which fits over a cylindrical flange 32 projecting from the top of the casing. When in normal position a pin 33 on the shaft 29 engages a stop pin 34 on the casing within the hollow interior 35 thereof and is maintained in this position by means of a coiled spring 36 secured at one end to the flange 32, as shown in Fig. 3, and at its other end to said shaft. For actuating the shaft 29, a spool 37 is mounted thereon within the casing and carries one end of a flexible connection or cable 38 which passes through a relatively rigid guide tube 39 connected at one end to the casing. The spring 36 rests on the top of the spool and is interposed between said top and a disk 36' held seated on the flange 32 by the cap 31. A pull on said cable turns the shaft 29 against the action of the spring 36 and when said shaft is rotated a quarter turn the pin 33 engages a stop pin 40 in the casing and at this time the indicator displays the sign "Stop" in full view of a machine approaching from the rear.

The flexible connection 38 is connected to a lever 41 pivotally supported beneath the machine and a link 42 connects this lever with one of the parts of the brake applying mechanism of the vehicle as a rod 43 is pivotally connected to the brake pedal 44 and to linkage connected to the brake band 45 which is shown generally but which need not be described in detail as the flexible connection may be suitably connected up with any brake-applying mechanism. While said connection might be operated by hand, its connection for actuation simultaneously with the applying of the brake is much preferred as it instantly warns the man behind without any thought on the part of the operator driving the machine provided with the device. A spring 46 forms a part of the flexible connection so that while the lever 41 is given a longer travel than is necessary to operate the signal, the spring allows of lost motion between said lever and connection.

I desire it to be understood that this invention is not limited to any specific form or arrangement of parts except in so far as such limitations are specified in the claims.

What I claim as my invention is:

1. In a vehicle signaling device, the combination of a tail light having a hollow supporting arm provided with an opening in its top, a cap fitting over said opening, a shaft passing down through said opening and vertically pivotally mounted in said cap and the bottom wall of said arm, a signal mounted on said shaft above the arm, means within the casing for normally maintaining said signal in inoperative position, a flexible connection having one end passing into the casing and secured to said shaft to turn the same to operate the signal, guide means for said flexible connection, and a member in the top of the casing through which light may pass upwardly to illuminate the signal.

2. In a vehicle signaling device, the combination of a tail light having a hollow supporting arm provided with an opening in its top, a cap fitting over said opening, a shaft passing down through said opening and vertically pivotally mounted in said cap and the bottom wall of said arm, a signal mounted on said shaft above the arm, means within said arm for limiting the turning movement of said shaft, a spring within the casing and connected to said shaft to normally maintain said signal in inoperative position, a flexible connection secured to said shaft for turning the same to display the signal, a guide tube for said flexible connection projecting from the side of said arm, and a lens in the top of the casing inclined toward the signal to direct some of the light from the tail light upon said signal.

In testimony whereof, I affix my signature.

GUSTAV E. ZIEMANN.